US008667800B2

(12) United States Patent
Cornwell et al.

(10) Patent No.: US 8,667,800 B2
(45) Date of Patent: Mar. 11, 2014

(54) FLAMELESS COMBUSTION SYSTEMS FOR GAS TURBINE ENGINES

(75) Inventors: Michael D. Cornwell, Bloomington, MN (US); Nicholas R. Overman, West Des Moines, IA (US); Ephraim Gutmark, Cincinnati, OH (US)

(73) Assignee: Delavan Inc., West Des Moines, IA (US)

( * ) Notice: Subject to any disclaimer, the term of this patent is extended or adjusted under 35 U.S.C. 154(b) by 1337 days.

(21) Appl. No.: 12/454,137

(22) Filed: May 13, 2009

(65) Prior Publication Data

US 2010/0287939 A1    Nov. 18, 2010

(51) Int. Cl.
*F02C 3/34* (2006.01)

(52) U.S. Cl.
USPC .................. 60/750; 60/737; 60/742; 60/746; 60/748

(58) Field of Classification Search
USPC ............................ 60/737, 740, 742, 746–750
See application file for complete search history.

(56) References Cited

U.S. PATENT DOCUMENTS

| | | | |
|---|---|---|---|
| RE23,149 E * | 9/1949 | Lubbock et al. ................ | 60/737 |
| 3,691,762 A * | 9/1972 | Ryberg et al. ............... | 60/39.511 |
| 3,872,664 A * | 3/1975 | Lohmann et al. ............... | 60/746 |
| 4,051,670 A * | 10/1977 | Pierce ............................. | 60/738 |
| 5,076,061 A | 12/1991 | Shekleton et al. | |
| 6,360,971 B1 * | 3/2002 | Keller ........................... | 239/543 |
| 6,834,505 B2 * | 12/2004 | Al-Roub et al. ................ | 60/737 |
| 7,065,972 B2 * | 6/2006 | Zupanc et al. .................. | 60/748 |
| 2004/0209129 A1 | 10/2004 | Carrea | |
| 2005/0155351 A1 | 7/2005 | Wunning et al. | |
| 2009/0113893 A1 * | 5/2009 | Li et al. .......................... | 60/737 |

OTHER PUBLICATIONS

Guillou, Erwann, "Flame Characteristics and Application of Flameless Combustion", Masters Thesis submitted to the Graduate Faculty of the University of Cincinnati, Dec. 2, 2007.*
UK Search Report dated Jul. 13, 2010.
Guillou, Erwann, "Flame Characteristics and Application of Flameless Combustion," A thesis submitted to the Graduate Faculty of the University of Cincinnati, Dec. 2, 2007.
Invitation to Rectify Deficiencies for Swedish Application No. 1050460-3 issued Apr. 4, 2011.

* cited by examiner

*Primary Examiner* — Ehud Gartenberg
*Assistant Examiner* — Lorne Meade
(74) *Attorney, Agent, or Firm* — Edwards Wildman Palmer LLP; Scott D. Wofsy; Joshua L. Jones

(57) ABSTRACT

A flameless burner for a gas turbine engine includes a burner body having a longitudinal axis, an upstream section and a downstream section. The upstream section of the burner body defines a primary swirl generating chamber having air swirlers associated therewith. The primary swirl generating chamber is adapted and configured to receive compressor discharge air through the air swirlers. The strong swirl of the compressor discharge air forms a recirculation zone that entrains combustion product gases toward the burner body. Fuel injectors are operatively connected to the downstream section of the burner body for issuing fuel into the recirculated combustion product gases.

11 Claims, 14 Drawing Sheets
(2 of 14 Drawing Sheet(s) Filed in Color)

FLAMELESS COMBUSTION SYSTEMS FOR GAS TURBINE ENGINES

BACKGROUND OF THE INVENTION

1. Field of the Invention

The present invention relates to gas turbine engines, and more particularly, to burners for combustors in gas turbine engines.

2. Description of Related Art

A variety of devices and methods are known in the art for injecting fuel into gas turbine engines. Of such devices, many are directed to injecting fuel into combustors of gas turbine engines to sustain combustion under lean conditions. Lean combustion is desirable for low power settings in gas turbine engines because it is fuel efficient and can produce relatively low levels of undesirable emissions. Aero gas turbine engines have progressively been designed to operate leaner and leaner in order to reduce $NO_X$ emissions. Industrial gas turbine engines have been switching to lean partially premixed combustion to operate lean, primarily to lower $NO_X$ production rates. However, the trend toward lean combustion has been impeded by operability concerns. Very lean combustion has proven to be very unstable. Flames produced in lean conditions tend to be unstable and if left unchecked the instability can result in lean flame blow out. Moreover, even if lean blow out does not occur, instabilities in lean combustion can result in strong acoustic waves that can cause undesirable noise and stress within the structures of a gas turbine engine. Measures can be taken to mitigate instabilities and control the combustion process to improve flame stability. However, at very lean conditions, e.g., below around 0.60 equivalence ratio for a gas turbine using liquid fuel, conventional methods may not be enough to provide the desired stability.

One way of providing stable combustion at very lean conditions is to use a flameless combustion process. Most combustion instabilities involve a three part cyclic process, where fluid mechanical phenomena result in a fluctuation in heat release rate that couples and reinforces an acoustic mode, which in turn trips an unstable fluid dynamic structure, which leads to fluctuations in heat release rate, and so on. In flameless combustion, such a coupling does not occur. The inability of coupling of this kind to occur in flameless combustion inhibits strong acoustic waves that could otherwise damage the combustor or turbine blades.

Flameless combustion has been successfully demonstrated in industrial furnaces. The technique involves using a very lean mixture wherein high temperature oxidizer reacts with fuel at very high levels of turbulence in a distributed reaction zone. Flameless combustion has been shown to produce very stable combustion having low $NO_X$ levels in industrial furnaces. This combustion method is called "flameless combustion" because of the lack of a discrete visible flame resulting from the distributed nature of the reaction. In industrial furnace applications of flameless combustion, the high oxidizer temperatures required are obtained by either preheating the air with furnace exhaust gases through a heat exchanger or by direct mixing of the air with hot recirculated exhaust gas. These furnaces typically recycle combustion gases via a duct external to the combustion region. These ducts and/or heat exchangers in conventional burners have limited the application of flameless combustion to ground based operations.

Such conventional methods and systems generally have been considered satisfactory for their intended purpose. However, there is still a need for improved devices and methods for producing flameless combustion without recirculation ducts or heat exchangers. The present invention provides a solution for these problems.

SUMMARY OF THE INVENTION

The subject invention is directed to a new and useful flameless burner for a gas turbine engine. The flameless burner includes a burner body having a longitudinal axis, an upstream section and a downstream section. The upstream section of the burner body defines a primary swirl generating chamber having an air swirler associated therewith. The primary swirl generating chamber is adapted and configured to receive compressor discharge air through the air swirler thereby forming a recirculation zone that entrains downstream combustion product gases toward the burner body. The burner also includes fuel injection means operatively connected to the downstream section of the burner body for issuing fuel into the recirculated combustion product gases.

The air swirler of the upstream section of the burner body can be a radial air swirler. A second radial air swirler can be defined between the primary swirl generating chamber and the downstream section of the burner body. A conical air swirler can be defined in the downstream section of the burner body proximate the primary swirl generating chamber. The flameless burner can include a diverging diffuser section defined in the downstream section of the burner body. A second air swirler can be defined in the diffuser section for injecting a swirling flow of compressor discharge air into the diffuser section. The first air swirler can be a radial swirler, and the second air swirler can be a conical swirler. It is also contemplated that the first and second air swirlers can both be radial swirlers.

The fuel injection means can include a plurality of fuel injector extension tubes extending downstream from the downstream section of the burner body with the injector extension tubes angled obliquely inward to inject fuel into recirculated combustion product gases. The fuel injection means can include at least one fuel injector having an exit orifice defined in a downstream facing surface proximate a throat portion of the burner body defined between the primary swirl generating chamber and the downstream section of the burner body. In another aspect, the fuel injection means can include a plurality of fuel injectors, each having an exit orifice defined in an inward facing surface of a diffuser in the downstream section of the burner body. The primary swirl generating chamber and air swirler can be configured to introduce a swirling flow of compressor discharge air into the primary swirl generating chamber in a substantially purely tangential direction. An upstream fuel injector can be defined in an upstream portion of the primary swirl generating chamber.

The upstream, downstream, and throat portions of the burner body can form a converging, diverging interior profile that converges proximate the throat portion. The throat portion of the burner body can include a plurality of secondary fuel injectors. Each of the fuel injectors can include an atomizing fuel nozzle configured to issue a jet of fuel that is co-injected with compressor discharge air to promote thorough fuel and air mixing prior to auto-ignition.

The primary swirl generating chamber, air swirler, and fuel injector can be configured and adapted to sustain a flameless combustion reaction wherein the fuel to air ratio is below about 0.4. The primary swirl generating chamber, air swirler, and fuel injector can be configured and adapted to sustain a flameless combustion reaction wherein CO emissions are below about 10 ppm, and/or $NO_X$ emissions are below about 10 ppm. The primary swirl generating chamber and air swirler can be configured to develop a swirling flow within the primary swirl generating chamber to establish a mixture of combustion product gases and compressor discharge air within a recirculation zone wherein the ratio of combustion product to compressor discharge air is at least about 2.5 to about 1.0.

These and other features of the devices and methods of the subject invention will become more readily apparent to those skilled in the art from the following detailed description of the preferred embodiments taken in conjunction with the drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that those skilled in the art to which the subject invention appertains will readily understand how to make and use the methods and devices of the subject invention without undue experimentation, preferred embodiments thereof will be described in detail herein below with reference to certain figures, wherein.

DETAILED DESCRIPTION OF THE PREFERRED EMBODIMENTS

Figure 1:
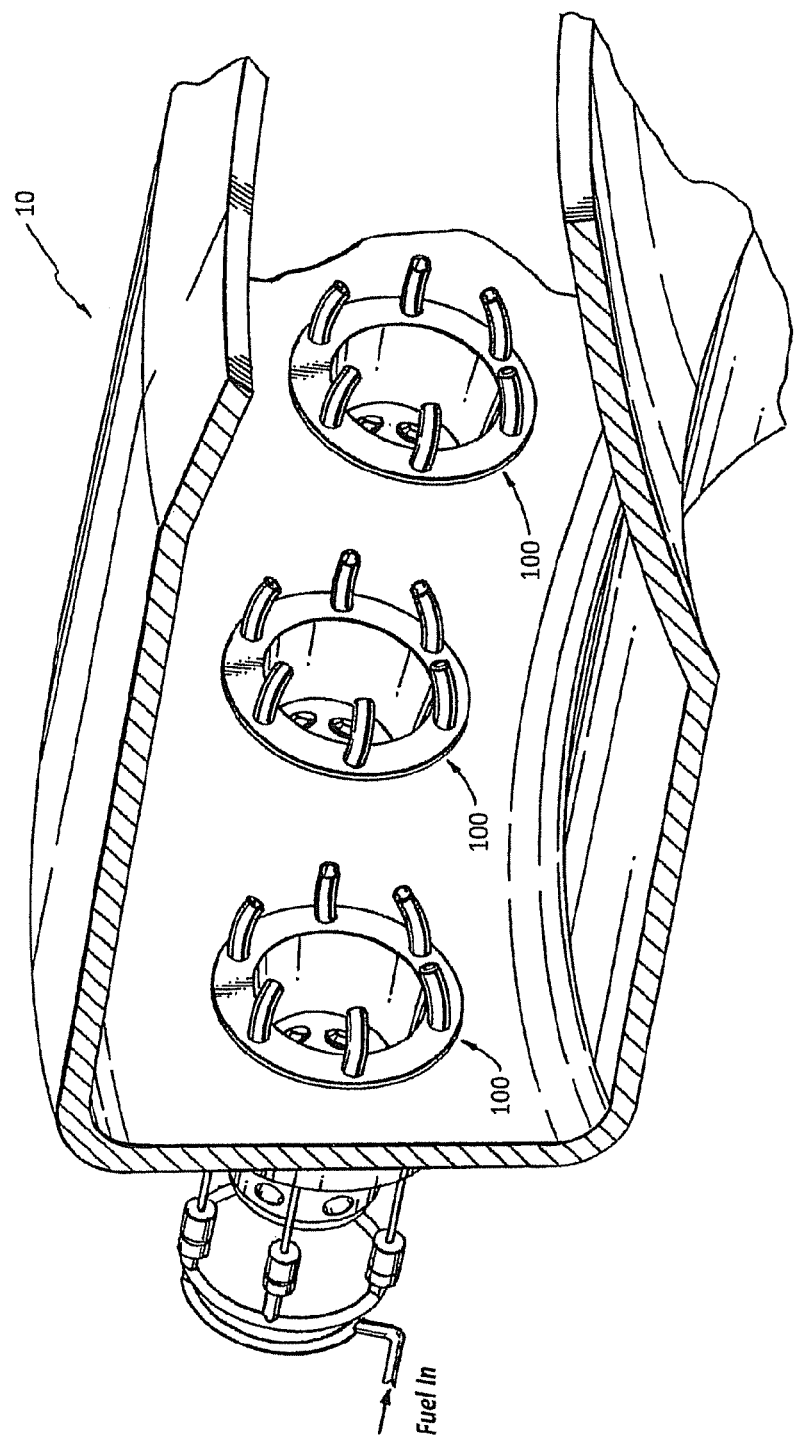
FIG. 1 is a perspective view of a portion of a combustor of a gas turbine engine including a representative embodiment of three flameless burners constructed in accordance with the present invention, showing the arrangement of burners within the combustor.

Reference will now be made to the drawings wherein like reference numerals identify similar structural features or aspects of the subject invention. For purpose of explanation and illustration, and not limitation, a partial view of an exemplary embodiment of a flameless burner in accordance with the invention is shown in FIG. 1 and is designated generally by reference character 100. Other embodiments of flameless burners in accordance with the invention, or aspects thereof, are provided in FIGS. 2-13, as will be described. The system of the invention can be used in gas turbine engines, or in any other suitable application, for sustaining stable flameless combustion.

Figure 2:
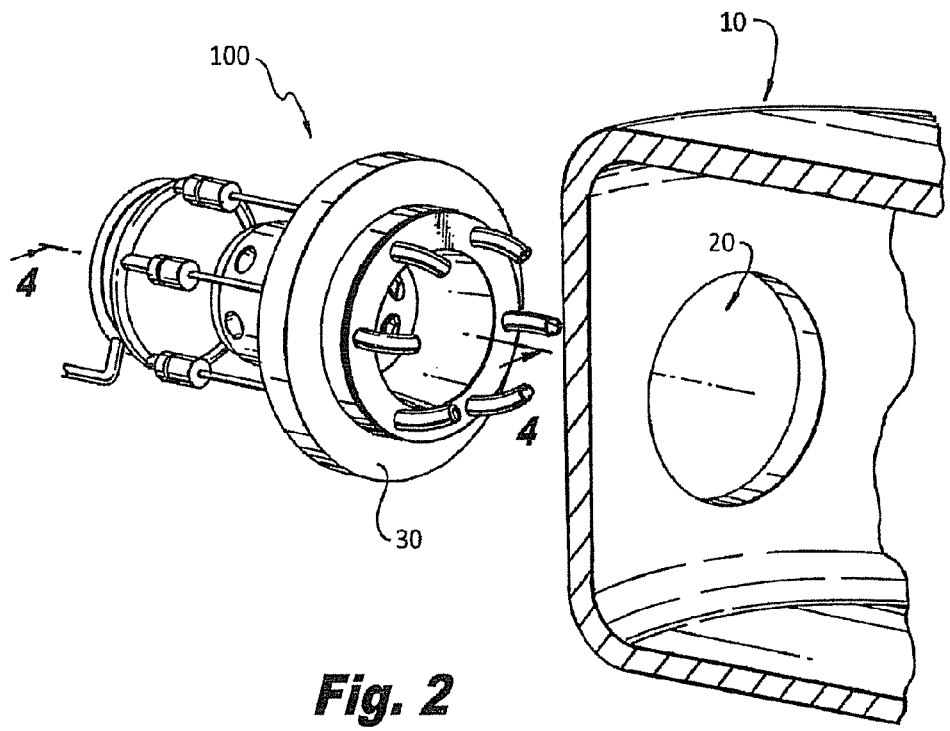
FIG. 2 is a perspective view of a portion of the combustor of FIG. 1, showing one of the flameless burners separated from the combustor.
Figure 3:
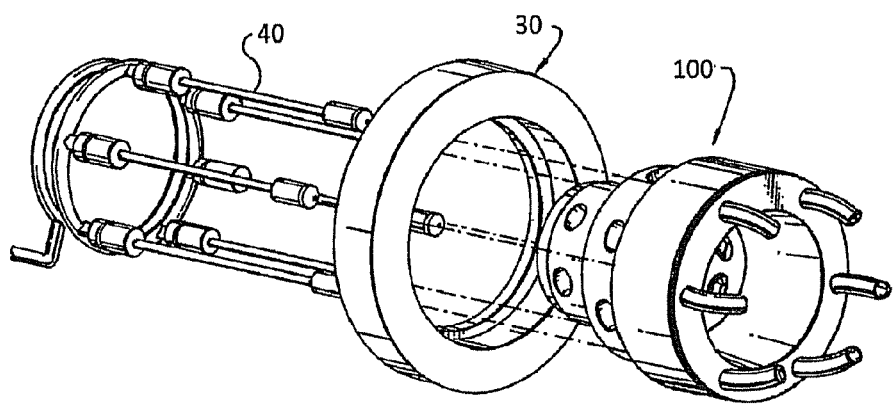
FIG. 3 is a partially exploded perspective view of the flameless burner of FIG. 2, showing how the fuel lines connect to the burner.

As shown in FIG. 1, flameless burners 100 are adapted for use in gas turbine engines, and can be arranged around a typical combustor 10. It is contemplated that flameless burners 100 can be used as the exclusive means of injecting fuel into combustor 10. It is also contemplated that flameless burners 100 can be interspersed with traditional fuel injectors within combustor 10. As indicated in FIG. 2, burner 100 is configured to be attached to combustor 10 by attaching a collar ring 30 to the combustor aperture 20. Any suitable attachment method can be used, including welding, brazing, or use of fasteners, such as are typically used to attach traditional fuel injectors to combustors. As shown in FIG. 3, fuel lines 40 are attached to burner 100 for delivering fuel from a source external to combustor 10 through burner 100 into the interior of combustor 10.

Figure 4:
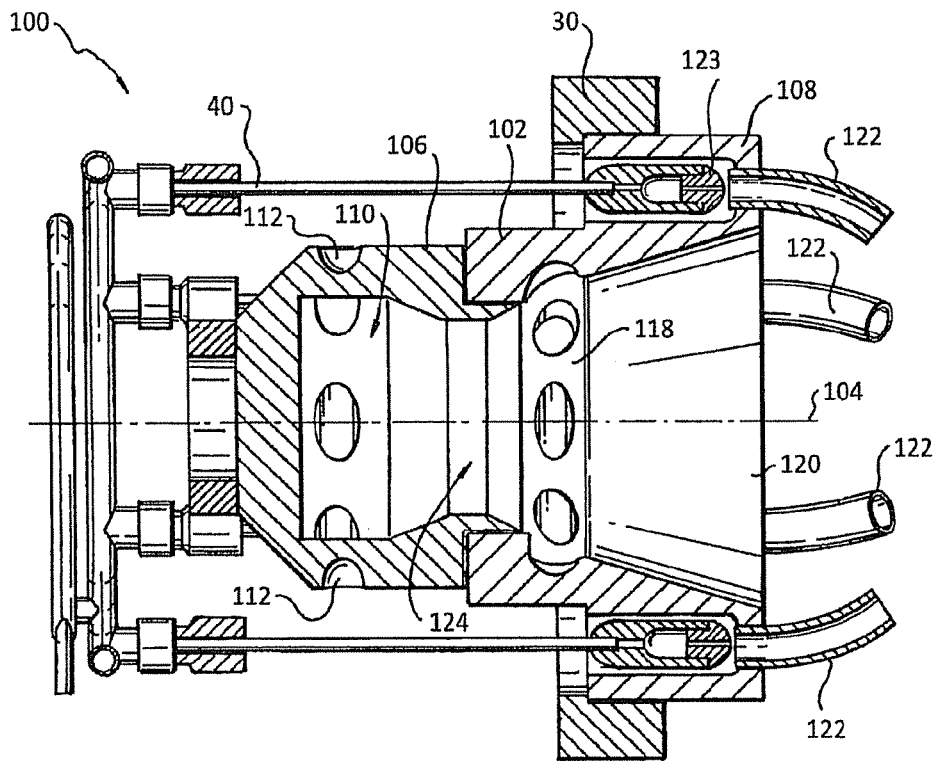
FIG. 4 is a cross-sectional side elevation view of the flameless burner of FIG. 3, showing the internal fuel and air passages of the burner.

FIG. 4 shows a cross-section of flameless burner 100. Burner 100 includes a burner body 102 having a longitudinal axis 104, an upstream section 106 and a downstream section 108. The upstream section 106 of burner body 102 defines a primary swirl generating chamber 110 having an air swirler 112 associated therewith. Primary swirl generating chamber 110 is adapted and configured to receive compressor discharge air through air swirler 112 so that the high swirl induced by the flow of compressor discharge air results in vortex breakdown and recirculates (entrains) the combustion products from downstream into primary swirl generating chamber 110.

Air swirler 112 of upstream section 106 of burner body 102 is a radial air swirler. A second radial air swirler 118 is defined between primary swirl generating chamber 110 and downstream section 108 of burner body 102. Flameless burner 100 has a diverging diffuser section 120 defined in downstream section 108 of burner body 102. Air swirler 118 is defined in diffuser section 120 for injecting a swirling flow of compressor discharge air into diffuser section 120. Primary swirl generating chamber 110 and air swirler 112 are configured to introduce a swirling flow of compressor discharge air into primary swirl generating chamber 110 in a substantially purely tangential direction. However, those skilled in the art will readily appreciate that any suitable swirler configuration can be used without departing from the spirit and scope of the invention, provided the swirl strength is sufficient to entrain combustion product gases to sustain flameless combustion.

Figure 5:
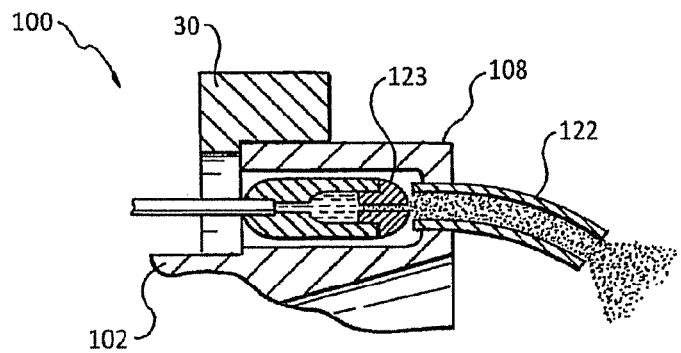
FIG. 5 is a cross-sectional side elevation view of a portion of the burner of FIG. 4, showing fuel issuing through one of the fuel nozzles.
Figure 6:
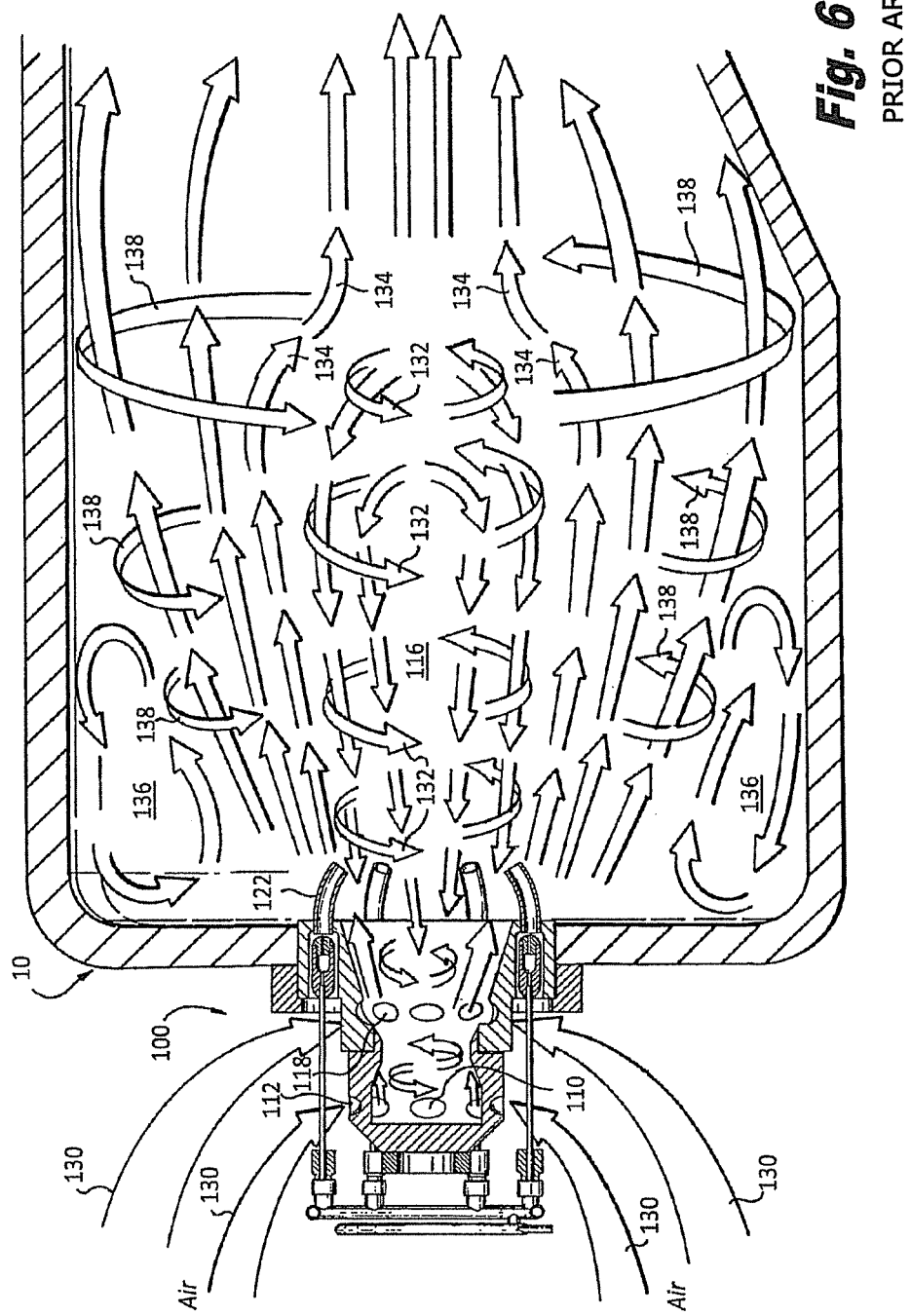
FIG. 6 is a cross-sectional side elevation view of a portion of the combustor of FIG. 1, showing a schematic representation of flow in the burner and combustor.

Burner 100 also includes fuel injector tips 123 and injector extension tubes 122 operatively connected to downstream section 108 of burner body 102 for issuing fuel into upstream flowing recirculation zone 116, which includes entrained combustion product gases (not shown in FIG. 4, but see FIG. 6). Injector extension tubes 122 inject both fuel and compressor discharge air. Fuel is partially or fully vaporized within injector extension tubes 122. Fuel injector tips 123 perform the fuel injection or atomization of fuel routed through injector extension tubes 122. As indicated in FIGS. 4 and 5, injector extension tubes 122 extend downstream from downstream section 108 and are angled obliquely inward to inject fuel into the entrained combustion product gases included in recirculation zone 116.

A throat portion 124 is defined at a narrow region of the interior of nozzle body 102 between primary swirl generating chamber 110 and diffuser section 120. Upstream, downstream, and throat portions 106/108/124 of burner body 102 form a converging, diverging interior profile that converges proximate throat portion 124. The convergent-divergent section stabilizes the stagnation point of the vortex producing a more stable recirculation zone as well as stabilizing the swirl within the recirculation chamber. This converging diverging structure prevents recirculating combustion products from entering primary swirl generating chamber 110 upstream of throat portion 124.

FIG. 6 shows a schematic representation of the flow pattern of air and combustion products developed within burner 100 and combustor 10 during operation. Compressor discharge air 130 is passed into the interior of burner 100 through swirlers 112 and 118 in a purely or nearly purely tangential direction with respect to central axis 104 of burner body 102. This creates a vortex 132 extending into the interior of combustor 10. Air also enters through injector extension tubes 122. The interior portion of vortex 132 has a lower pressure than its surroundings, and since vortex 132 extends well within combustor 10, combustion discharge gases of recirculation zone 116 are entrained within vortex 132 and are conveyed back as far upstream as a stagnation point just downstream of throat 124. Injector extension tubes 122 have outlets within or in close proximity to the recirculated combustion discharge gases in recirculation zone 116 so as to be able to inject fuel into the recirculated or entrained combustion discharge gases of recirculation zone 116. Since combustion discharge gases typically have a temperature in a range, for example from around 900° C. to about 1800° C., depending on equivalence ratio, or below about 1200° C. for very lean combustion, there is sufficient heat to sustain combustion of fuel injected from injector extension tubes 122.

With continued reference to FIG. 6, the combustion air flow exiting burner 100 has a strong swirl that is induced by swirlers 112 and 118 and induces the strong swirl of vortex 132 of the combustion products in chamber 10 causing vortex breakdown that generates a recirculation zone 116 in the center of chamber 10. This recirculation zone 116 carries hot and oxygen depleted combustion products upstream up to the upstream stagnation point (located at throat 124 as shown in FIG. 4) and then down stream as indicated by arrows 134. During this upstream and downstream motion, the flows mix with the fuel jets that are injected through injector extension tubes 122 and ignite them. Some of the combustion also occurs in the outer recirculation zones 136.

Downstream flowing mixed flow 134 can include incoming air or previously recirculating gases, due to the strong mixing taking place in chamber 10 between fresh combustion air, hot combustion products, and fuel, which strong mixing is a characteristic of flameless combustion. A shear zone exists between upstream flowing recirculating compressor discharge gases in recirculation zone 116 and downstream flowing mixed flow 134 flowing from the burner through combustor 10 to a downstream turbine (not shown). Vortex 132 resides within this shear zone. Additionally, outer recirculation zones 136 develop in the corners of combustor 10 adjacent the outlet of burner 100. Another shear zone exists between downstream flowing mixed flow 134 and the recirculating gases of outer recirculation zones 136. Arrows 138 schematically indicate a tangential flow component that is present through the entire chamber, including upstream and downstream flowing gases. The circumferential flow 138 is larger near the walls of chamber 10. Flow 138 is not required for flameless combustion, but is a product of the strong swirl induced by burner 100.

The combination of the various flow components results in an overall flow pattern that promotes mixing of fuel, compressor discharge air, and combustion product gases. The result is a substantially uniform combustion reaction in which there is no distinct flame front. The fuel is supplied from injector extension tubes 122, the oxygen is supplied from the compressor discharge air 130 as well as unused oxygen from the combustion products, and the heat for sustained combustion comes from recirculated combustion product gases. Sustained combustion does not need to come from a distinct flame front, coupled with flow instabilities and acoustics, as in traditional combustors. Instead, the combustion reaction is distributed in a generally uniform manner that closely approximates the well-mixed ideal. The resulting combustion reaction has excellent flame stability even at very lean mixtures as is typical of known flameless combustion systems. However, since the swirl induced by the compressor discharge air is used to entrain the combustion product gases for sustaining the combustion reaction, none of the heavy recirculation ducts or heat exchangers typical of known flameless combustors are required to achieve flameless combustion. The conditions required to obtain the flameless mode of operation are: high turbulence for strong mixing, high temperature and low oxygen concentration in the mixed combustion air and combustion products where they mix with the fuel. Burner 100 enables these conditions to be achieved while also having an acceptable pressure drop of approximately 4%, which is important for high efficiency in gas turbine engines.

Primary swirl generating chamber 110, air swirlers 112/118, and injector extension tubes 122 are configured and adapted to sustain a flameless combustion reaction wherein the fuel to air ratio is below about 0.4. The transition from non-flameless mode to a flameless mode is gradual. As the air/fuel ratio is reduced below around 0.6, it gradually transitions to a flameless mode. Low emissions characteristics can also be sustained at a higher fuel to air ratio than 0.4, but at significantly higher values, e.g., greater than about 0.6, the combustion is not distributed and cannot be described as flameless. However, even at these higher fuel/air ratios, burner 100 provides combustion that is still stable and has low emissions. Those skilled in the art will therefore appreciate that the transition equivalence ratios provided herein are exemplary and that burners having any suitable transition equivalence ratio can be utilized without departing from the spirit and scope of the invention.

Primary swirl generating chamber 110, air swirlers 112/118, and injector extension tubes 122 can sustain a flameless combustion reaction wherein $NO_X$ emissions are below about 10 ppm and CO emissions below about 10 ppm. Previous gas turbine technologies can either provide such low $NO_X$ emissions, at lean equivalence ratios, or such low CO emissions, but not both at the same equivalence ratio. In previous gas turbine technologies, $NO_X$ emissions tend to be reduced as the equivalence ratio approaches lean blow out, but CO emissions tend to increase as the equivalence ratio approaches lean blow out. Primary swirl generating chamber 110 and air swirler 112 develop a swirling flow within primary swirl generating chamber 110 to establish a mixture of combustion product gases and compressor discharge air within a recirculation zone wherein the ratio of combustion product to compressor discharge air is at least about 2.5 to about 1.0.

Figure 7:
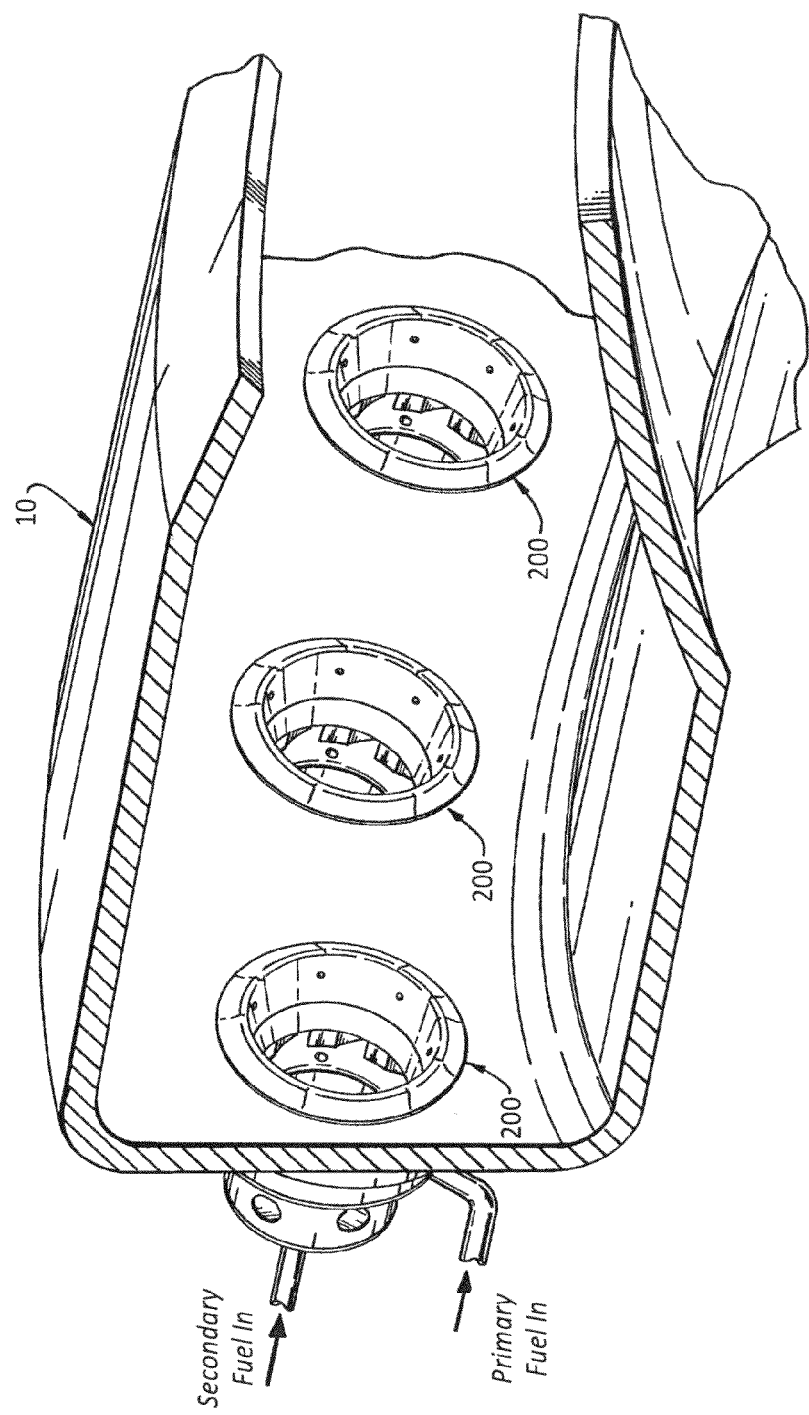
FIG. 7 is a perspective view of a portion of a combustor of a gas turbine engine including another representative embodiment of three flameless burners constructed in accordance with the present invention, showing the arrangement of burners within the combustor.
Figure 8:
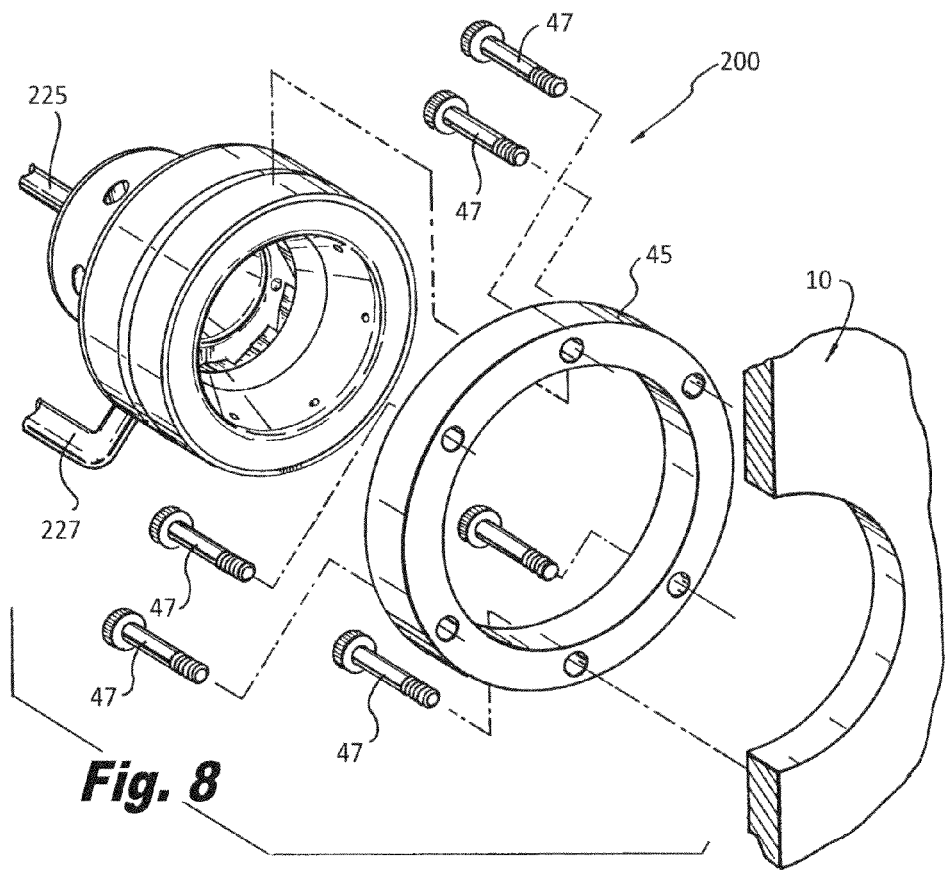
FIG. 8 is a partially exploded perspective view of the combustor and one of the flameless burners of FIG. 7, showing how the burner connects to the combustor.

FIG. 7 shows a portion of combustor 10 having three burners in accordance with another exemplary embodiment of a flameless burner 200. Burner 200 is staged to supply fuel to combustor 10 in a primary stage and a secondary stage, as indicated by fuel flow arrows in FIG. 7. As indicated in FIG. 8, Burner 200 attaches to combustor 10 by way of collar 45 and fasteners 47, however, any other suitable method of joining can be used.

Figure 9:
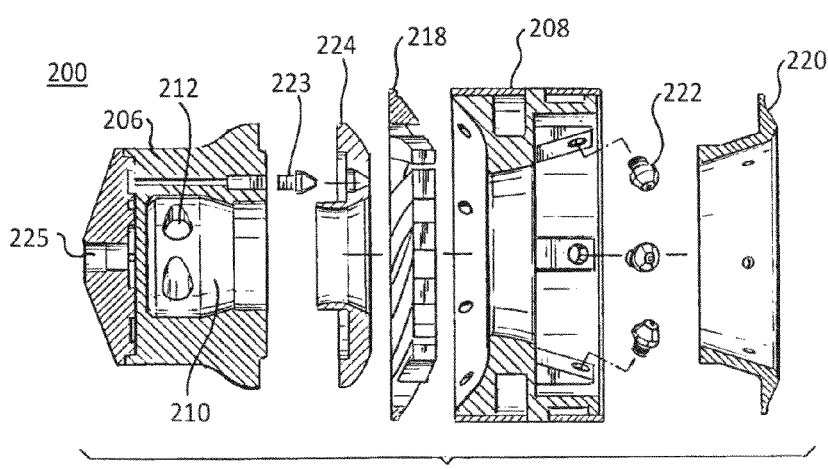
FIG. 9 is an exploded cross-sectional side elevation view of the flameless burner of FIG. 8, showing the primary swirl generating chamber, air swirlers, and fuel injectors.
Figure 10:
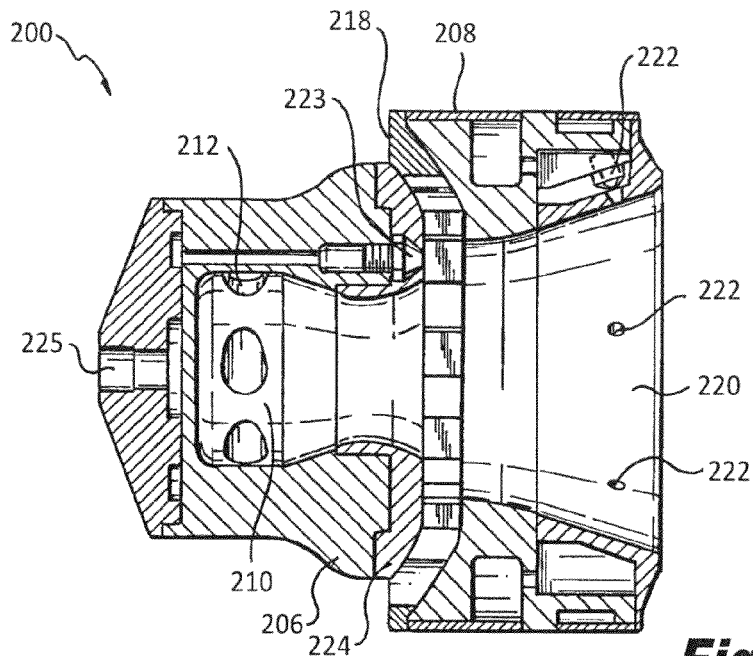
FIG. 10 is a cross-sectional side elevation view of the flameless burner of FIG. 9, showing the air and fuel flow passages through the burner.
Figure 11:
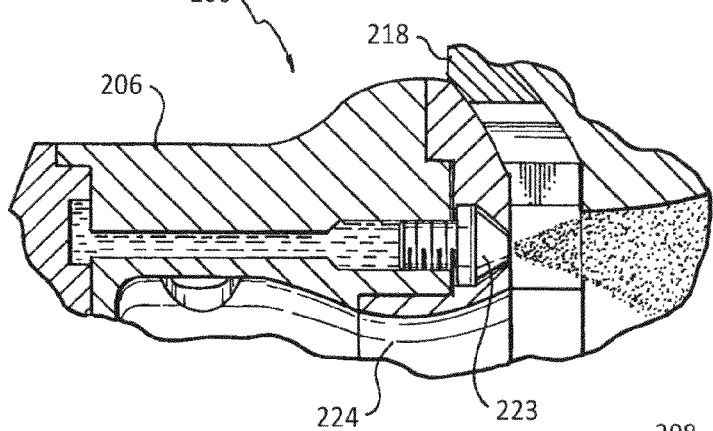
FIG. 11 is a cross-sectional side elevation view of a portion of the flameless burner of FIG. 10, showing fuel issuing through a secondary fuel nozzle.
Figure 12:
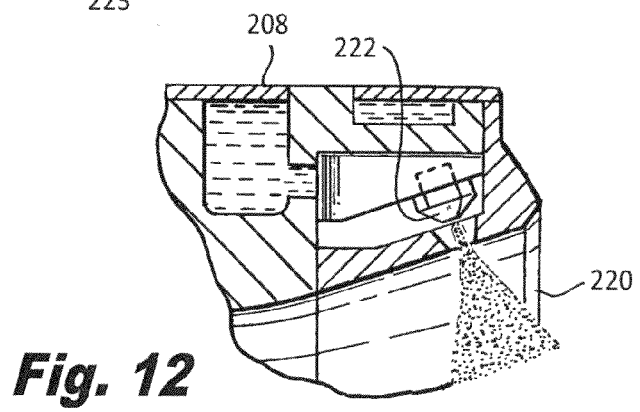
FIG. 12 is a cross-sectional side elevation view of a portion of the flameless burner of FIG. 10, showing fuel issuing through a primary fuel nozzle.

As shown in FIGS. 9 and 10, burner 200 includes an upstream portion 206 defining a primary swirl generating chamber 210, air swirler 212, and a downstream portion 208 much as described above with respect to burner 100. Throat 224, conical swirler 218, and diffuser section 220 are separate components assembled into burner 200, as indicated in FIG. 9. FIG. 10 shows secondary fuel injectors 223, each having an exit orifice defined in a downstream facing surface of throat portion 224. Fuel circuitry is shown in FIG. 10 for conducting secondary fuel through central conduit 225 to secondary fuel injectors 223. FIG. 11 shows an enlarged view of fuel issuing through the fuel circuitry and out through injector 223. Downstream portion 208 includes a plurality of primary fuel injectors 222, each having an exit orifice defined in an inward facing surface of diffuser 220. FIG. 12 shows an enlarged view of fuel issuing through the fuel circuitry and out through injector 222, which fuel enters burner 200 through inlet 227 (see FIG. 8). Each of the fuel injectors 222/223 can include an atomizing fuel nozzle configured to issue a jet of fuel that is co-injected with compressor discharge air to promote thorough fuel and air mixing prior to auto-ignition. Optionally, one or more additional fuel injectors could be located in the upstream-most surface of primary swirl generating chamber 210. Those skilled in the art will readily appreciate that any suitable type of nozzles can be used in conjunction with injectors as described herein, that the designations "primary" and "secondary" herein are used for clarity only, and that traditional roles of primary and secondary fuel injectors can be altered or reversed as needed without departing from the spirit and scope of the invention.

Figure 13:
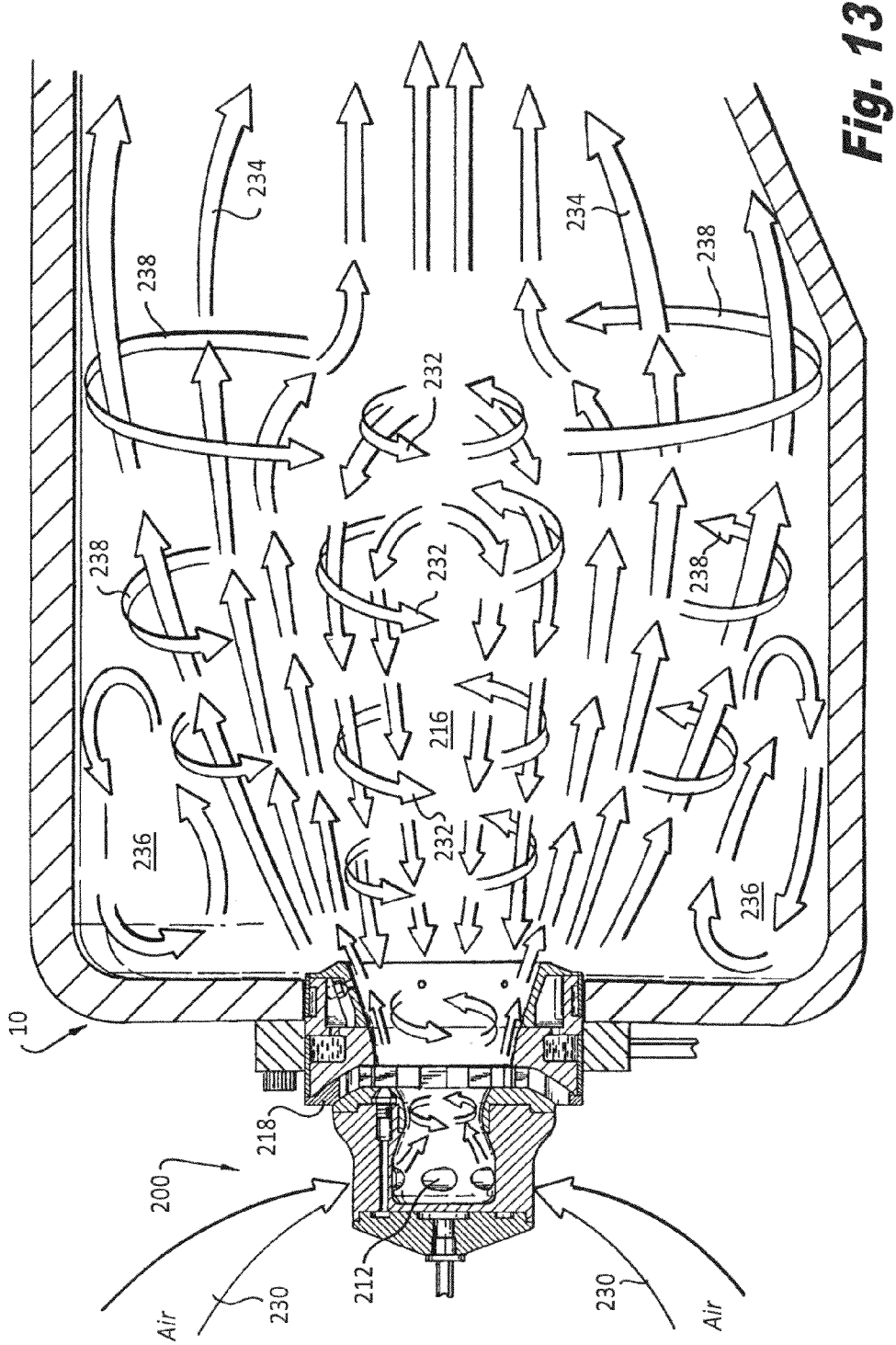
FIG. 13 is a cross-sectional side elevation view of a portion of the combustor of FIG. 7, showing a schematic representation of air flow in the burner and combustor.

FIG. 13 shows a schematic representation of the flow pattern created by burner 200 in combustor 10. Compressor discharge air 230 is passed into the interior of burner 200 through swirlers 212 and 218 in a purely or nearly purely tangential direction. Air also enters around injectors 222 (as shown in FIGS. 10 and 12), but not through upstream injectors 223. Those skilled in the art will appreciate that injectors 223 could be modified to include an air flow as in injectors 222. When injectors 222 and/or 223 are configured to inject air and fuel, they can be used as an air assist circuit. This creates a vortex 232, entrains combustion discharge gases in a recirculation zone 216, provides downstream flowing mixed flow 234, outer recirculation zones 236, and a tangential flow component 238, much as those described above with reference to FIG. 6. Fuel injectors 222/223 have outlets in close proximity to the recirculated combustion discharge gases in recirculation zone 216 so as to be able to inject fuel into the combustion discharge gases 216. Injectors 222/223 take a greater pressure drop compared with injectors 123 with injector extension tubes 122 described above. Injectors 222/223 provide sufficient fuel momentum to allow penetration of the fuel into the flow field such that fuel penetrates the vortex and is entrained into recirculation zone 216. Thus, extension tubes are not needed to pierce the vortex and directly deposit fuel into recirculation zone 216. Injectors 222/223 can be atomizer tips, discrete jet injectors, or any other suitable injection means that can provide sufficient fuel momentum.

Figure 14:
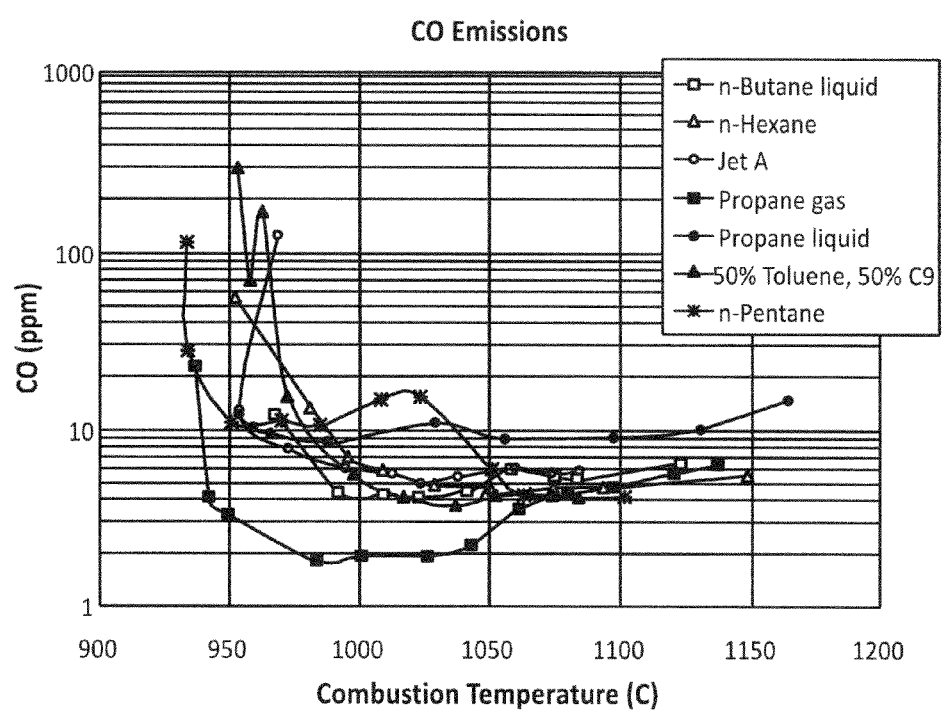
FIG. 14 is a plot of CO emissions over a range of combustion temperatures for seven different fuel types in an exemplary flameless burner constructed in accordance with the present invention.
Figure 15:
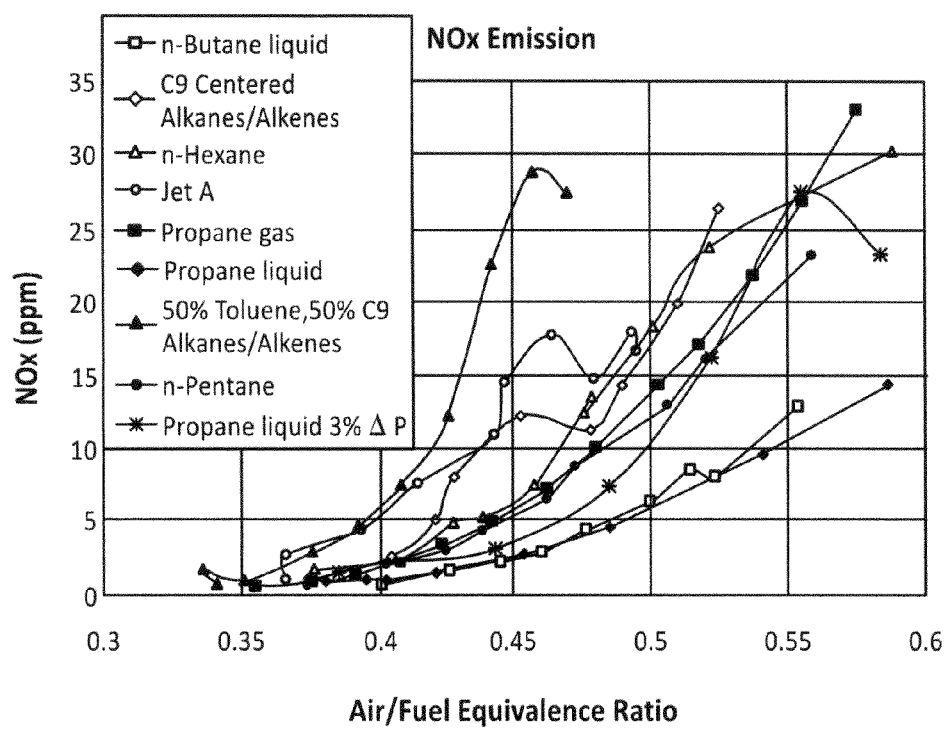
FIG. 15 is a plot of $NO_X$ emissions over a range of air/fuel equivalence ratios, which corresponds to the range of combustion temperatures in FIG. 14, for nine different fuel types in the flameless burner of FIG. 14.

A burner was constructed substantially as described above with respect to burner 100, shown in FIGS. 3-5. The burner was tested in a test chamber. The plots in FIGS. 14 and 15 show both CO & $NO_X$ concentrations over a range of equivalence ratios, with flame temperature directly related to equivalence ratio on the horizontal axes of the plots. A variety of fuels was tested, with the most important for gas turbine engines being Jet-A. Results for Jet-A demonstrated emissions of CO below 10 ppm for an equivalence ratio above approximately 0.36, and $NO_X$ below 10 ppm for an equivalence ratio below about 0.43. Thus there is a range between about 0.36-0.43 in which both CO & $NO_X$ emissions are simultaneously below 10 ppm. The tested design incorporated fuel staging to increase the range of ultra-low emissions. However, the transition into flameless regime and ultra-low emissions is only gradual and emission concentrations increase slowly until near lean-blow-out.

The flame structure generated through flameless combustion parallels that of a well stirred reactor. For an equivalence ratio above approximately 0.40 for Jet-A, the flame structure produced by the burner resembles that of traditional gas turbine injectors in which a distinct flame shape can be determined from the concentration of OH & CH radicals. However, at lower equivalence ratios, the flame shape is no longer discernable as depicted by the wide and evenly spread OH and CH radicals. When the radicals of combustion encompass the majority of the combustion chamber and a flame shape can no longer be discerned it can be said that the combustion process is in the flameless regime.

Figure 16:
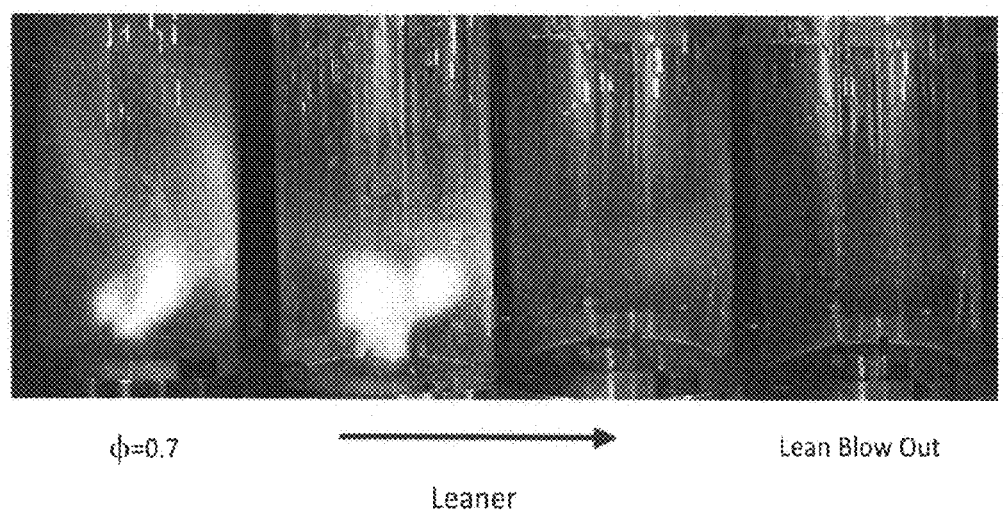
FIG. 16 is a series of photographs of conditions within the test apparatus of the flameless burner of FIG. 14, showing combustion characteristics across a range of air/fuel ratios.
Figure 17:
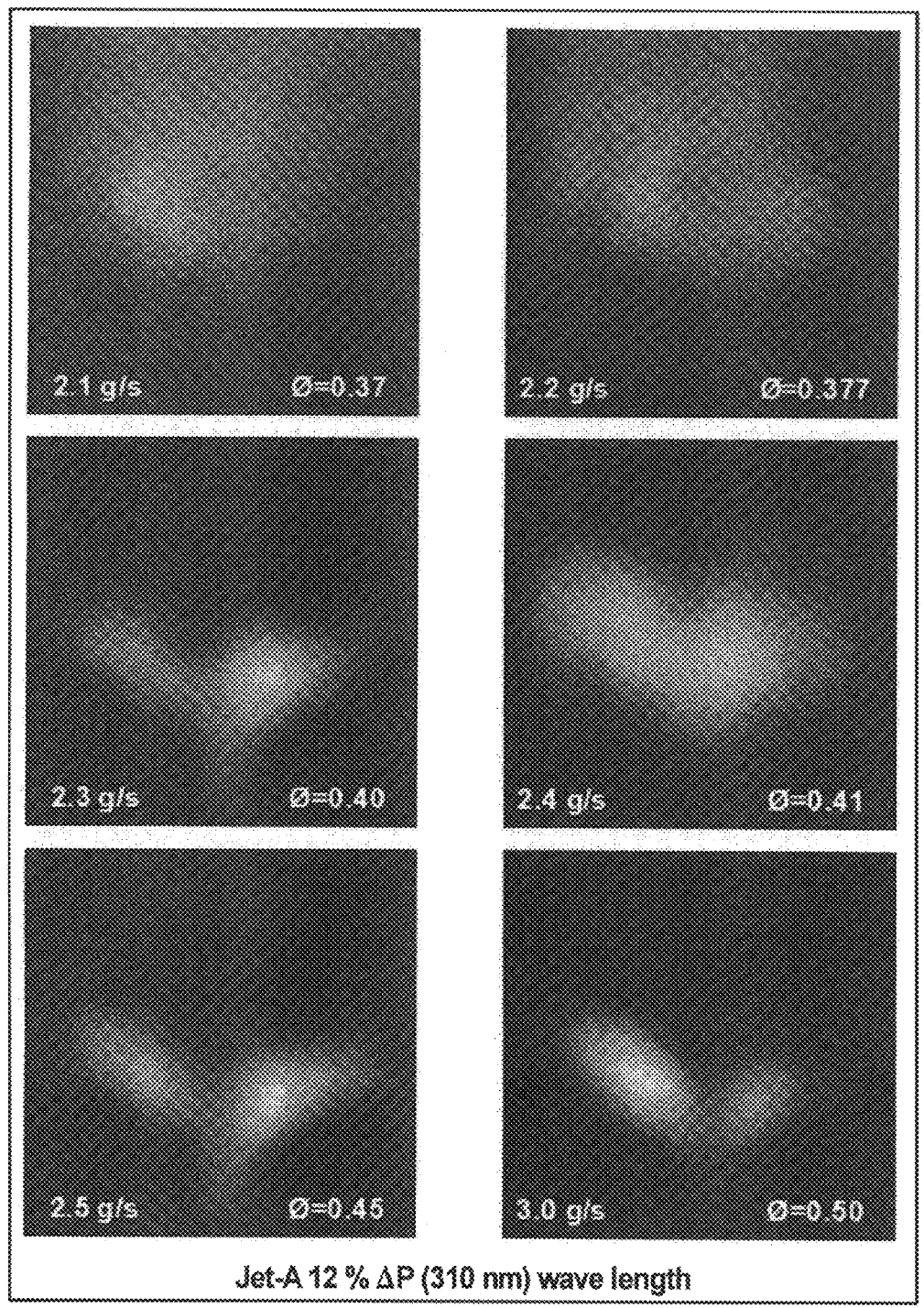
FIG. 17 is a series of 310 nm wavelength images of combustion in the flameless burner of FIG. 14, showing conditions for Jet-A fuel, 12% ΔP for six different air/fuel ratios.

As shown in the images of FIGS. 16 and 17, at equivalence ratios above approximately 0.40 the flame is anchored by the recirculation zone: those skilled in the art will recognize this as a swirl stabilized flame classically used in gas turbine engines. This type of flame is prone to instabilities as perturbations in the forward stagnation point of the vortex can couple with the flame. When combustion is in the flameless regime the flame is no longer anchored or stabilized at a single point or by the central vortex, therefore, perturbations in fluid structure have little effect on the combustion process. In FIG. 16, the lean blow out indicated refers to lean blow out on the test apparatus.

The test design successfully performed combustion in the flameless regime, but had asymmetries of fuel distribution that limited performance. This can be corrected by using an improved internal fuel manifold and eliminating large variations in the length and position of the fuel extension tubes.

Figure 19:
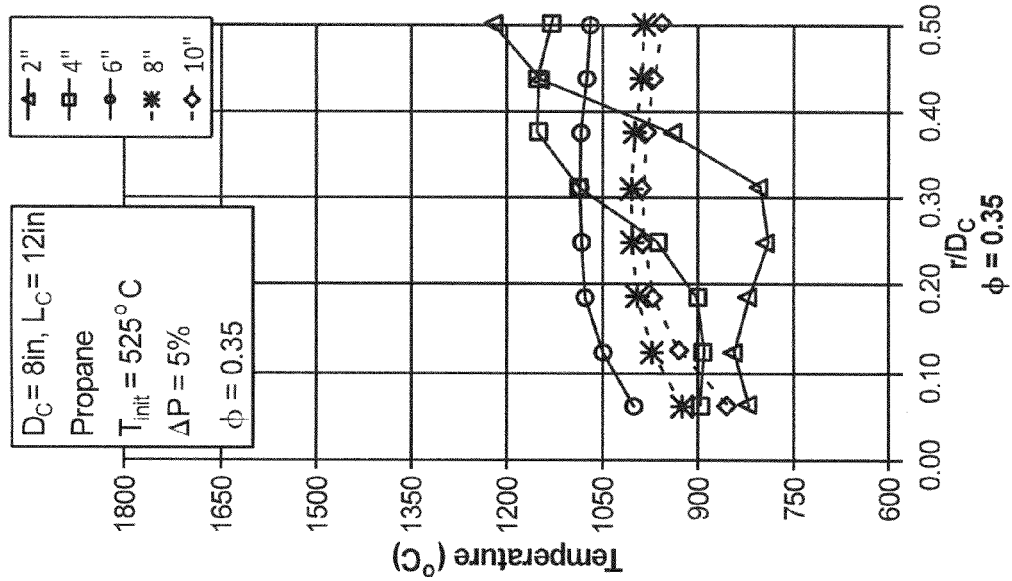
FIG. 19 is a plot of temperature over a range of radial positions for the flameless burner of FIG. 14 at an equivalence ratio of 0.35, showing the temperature profile at five different axial locations.
Figure 18:
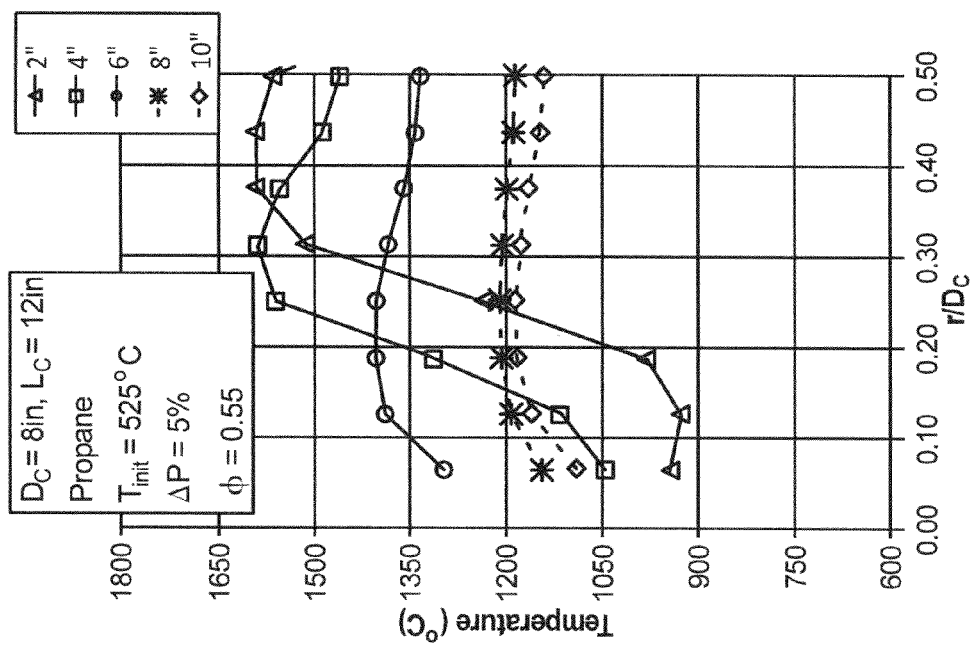
FIG. 18 is a plot of temperature over a range of radial positions for the flameless burner of FIG. 14 at an equivalence ratio of 0.55, showing the temperature profile at five different axial locations.

Due to the distributed nature of flameless combustion, the temperature distribution is also improved above that of classic gas turbine injectors. Again, viewing the burner at a high equivalence ratio, the temperature distribution is similar to classic injectors with higher temperatures near the center of the combustor and cooler temperatures near the wall, as shown in FIG. 18, where $r/D_C=0.0$ corresponds to the center of the combustor and $r/D_C=0.5$ corresponds to the wall. This behavior is exhibited only for the curves taken 6", 8", and 10" downstream of the burner because the curves taken at 2" and 4" distances are so close to the burner that the flow was not as developed. The higher central temperatures are a strong producer of thermal $NO_X$ as well placing larger thermal stresses on the turbine section downstream. The flameless regime results in the same bulk or average temperature across the combustor but at any diametric position the temperature is much closer to the average, as indicated in FIG. 19. In FIGS. 18 and 19, the various curves are plotted at different locations along the length of the combustor, as indicated by the key in FIG. 19. In the cases shown in FIG. 19, the temperature is relatively uniform at a length-to-diameter ratio of 0.75. Beyond that the temperature remains uniform but decreases indicating complete combustion by the axial position of 0.75 L/D, or only 6 inches. Beyond the 0.75 L/D ratio heat is lost through the combustor walls, which are exposed to near STP conditions (standard temperature and pressure).

Figure 20:
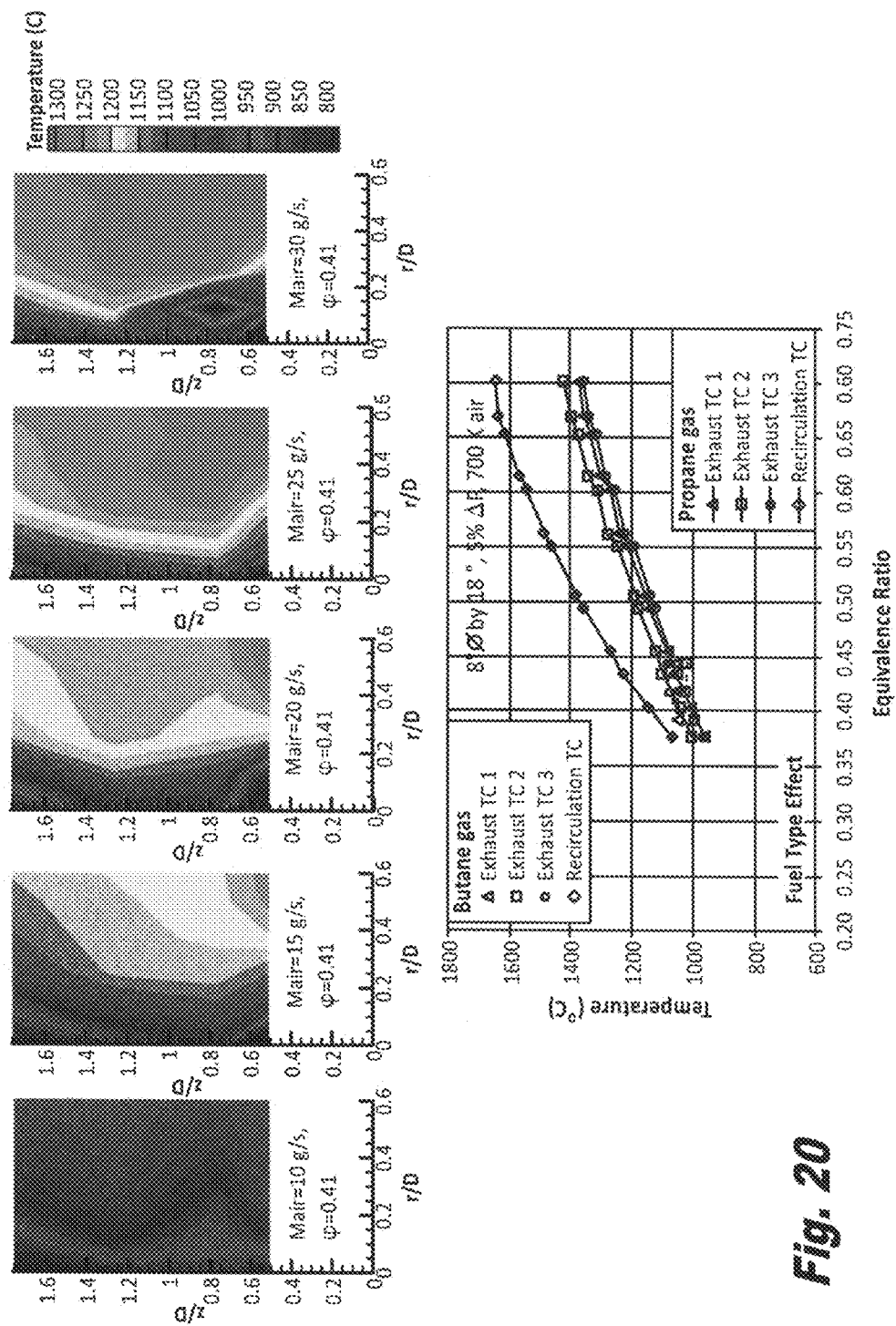
FIG. 20 is a group of plots showing temperature over a range of axial and radial locations in the flameless burner of FIG. 14 for five different flow rates, as well as a plot of temperature over a range of equivalence ratios for four locations and two different fuel types.

FIG. 20 shows five plots of temperature data taken from the test apparatus. An array of thermocouples was transverse across the flow in the test apparatus to obtain temperature data at various axial and radial locations, as indicated in the five area plots. Each plot corresponds to a different flow rate in the burner, as indicated. FIG. 20 also shows a plot of temperature as a function of equivalence ratio for three thermocouples in the exhaust and a thermocouple placed in the throat of the recirculation chamber upstream of fuel injection, labeled "Recirculation TC" in FIG. 20. The recirculation thermocouple demonstrated temperatures in the recirculation zone approximate those of combustion, indicating that recirculation of the hot combustion gases into the throat area of the burner does occur.

The methods and systems of the present invention, as described above and shown in the drawings, provide for flameless combustion with superior properties including no need for heavy recirculation ducts or heat exchangers as in previously known flameless burners. This improvement allows for the benefits of flameless combustion for gas turbine engines in an aircraft setting, as well as in ground-based gas turbine engines, or any other gas turbine engine setting. While the apparatus and methods of subject invention have been shown and described with reference to preferred embodiments, those skilled in the art will readily appreciate that changes and/or modifications may be made thereto without departing from the spirit and scope of the subject invention.

What is claimed is:

1. A flameless burner for a gas turbine engine comprising:
   a) a burner body having a longitudinal axis, an upstream section and a downstream section, the upstream section of the burner body defining a primary swirl generating chamber and a throat downstream thereof, the primary swirl generating chamber having an air swirler associated therewith and adapted and configured to receive compressor discharge air through the air swirler and thereby form a recirculation zone that entrains downstream combustion product gases toward the burner body;
   b) a plurality of primary fuel injectors, each having an inwardly facing exit orifice defined in a diffuser of the burner body downstream of the throat; and
   c) at least one secondary fuel injector having a downstream facing exit orifice defined downstream of the throat,
   wherein the primary and secondary fuel injectors are configured and adapted for issuing fuel into a recirculation zone of entrained combustion product gases.

2. A flameless burner as recited in claim 1, wherein the air swirler of the upstream section of the burner body is a radial air swirler.

3. A flameless burner as recited in claim 2, further comprising a second radial air swirler defined between the primary swirl generating chamber and the downstream section of the burner body.

4. A flameless burner as recited in claim 2, further comprising a conical air swirler defined in the downstream section of the burner body proximate the primary swirl generating chamber.

5. A nameless burner as recited in claim 1, wherein the downstream facing exit orifice of the at least one secondary fuel injector is defined between the primary swirl generating chamber and the diffuser.

6. A flameless burner for a gas turbine engine comprising:
   a) a burner body having an upstream section, a downstream section, and a throat portion defined between the upstream and downstream sections, the upstream section defining a primary swirl generating chamber having a first air swirler associated therewith, wherein the primary swirl generating chamber is configured to receive compressor discharge air through the first air swirler and thereby form a recirculation zone that entrains downstream combustion product gases toward the burner body;
   b) a diverging diffuser section defined in the downstream section of the burner body with a second air swirler defined in the diffuser section for injecting a swirling flow of compressor discharge air into the diffuser section;
   c) a plurality of primary fuel injectors operatively connected to the burner body, each primary fuel injector having an exit orifice defined in an inward facing surface of a diffuser in the downstream section of the burner body; and
   d) at least one secondary fuel injector having a downstream facing exit orifice defined downstream of the throat,
   wherein the primary and secondary fuel injectors are configured and adapted for issuing fuel into a recirculation zone of entrained combustion product gases.

7. A flameless burner as recited in claim 6, wherein the first air swirler is a radial swirler, and wherein the second air swirler is a conical swirler.

8. A flameless burner as recited in claim 6, wherein the upstream, downstream, and throat portions of the burner body form a converging, diverging interior profile that converges proximate the throat portion.

9. A flameless burner as recited in claim 6, wherein the first and second air swirlers are both radial swirlers.

10. A flameless burner as recited in claim 6, wherein each of the primary fuel injectors includes an atomizing fuel nozzle configured to issue a jet of fuel that is co-injected with compressor discharge air to promote thorough fuel and air mixing prior to auto-ignition.

11. A flameless burner for a gas turbine engine comprising:
   a) a burner body having a longitudinal axis, an upstream section and a downstream section, the upstream section of the burner body defining a throat and a primary swirl generating chamber having an air swirler associated therewith, wherein the primary swirl generating chamber is adapted and configured to receive compressor discharge air through the air swirler and thereby form a recirculation zone that entrains downstream combustion product gases toward the burner body, the downstream section defining a diffuser; and
   b) at least one fuel injector having a downstream facing exit orifice defined downstream of the throat between the primary swirl generating chamber and the diffuser for issuing fuel into recirculated combustion product gases.

* * * * *